(12) United States Patent
Wu et al.

(10) Patent No.: US 11,294,888 B2
(45) Date of Patent: Apr. 5, 2022

(54) BLOCKCHAIN SYSTEM AND BLOCKCHAIN TRANSACTION DATA PROCESSING METHOD BASED ON ETHEREUM

(71) Applicant: PING AN TECHNOLOGY(SHENZHEN) CO., LTD., Shenzhen (CN)

(72) Inventors: Yiming Wu, Shenzhen (CN); Qingshan Gu, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 827 days.

(21) Appl. No.: 16/097,876

(22) PCT Filed: Nov. 23, 2017

(86) PCT No.: PCT/CN2017/112664
§ 371 (c)(1),
(2) Date: Oct. 31, 2018

(87) PCT Pub. No.: WO2019/080235
PCT Pub. Date: May 2, 2019

(65) Prior Publication Data
US 2021/0256007 A1 Aug. 19, 2021

(30) Foreign Application Priority Data
Oct. 26, 2017 (CN) .......................... 201711017023.3

(51) Int. Cl.
*G06F 16/23* (2019.01)
*G06F 11/14* (2006.01)
(Continued)

(52) U.S. Cl.
CPC ...... *G06F 16/2379* (2019.01); *G06F 11/1464* (2013.01); *G06F 11/1474* (2013.01);
(Continued)

(58) Field of Classification Search
CPC ... H04L 9/3239; H04L 9/3263; H04L 9/3268; H04L 41/0663; H04L 63/0823;
(Continued)

(56) References Cited

U.S. PATENT DOCUMENTS 5,214,702 A * 5/1993 Fischer .................. G06F 21/00
380/30
2007/0214355 A1 9/2007 Lamport
2017/0193464 A1 7/2017 Sher

FOREIGN PATENT DOCUMENTS

CN 106445711 A 2/2017
CN 106447311 A 2/2017
(Continued)

OTHER PUBLICATIONS

PCT/CN2017/090572 Chinese International Search Report dated Dec. 22, 2017, 10 pages. (not translated).
(Continued)

*Primary Examiner* — Azizul Choudhury
(74) *Attorney, Agent, or Firm* — Polsinelli PC (57) ABSTRACT

The present application relates to a blockchain system based on Ethereum, including a master node configured to receive a transaction request transmitted by a client terminal, perform transaction processing by calling a smart contract deployed in a consortium blockchain according to the transaction request to obtain transaction data; and use the transaction data to generate a block, and broadcast the block is to the plurality of backup nodes; backup node configured to receive the block and verify the transaction data of the block; the master node is further configured to generate a first-stage certificate using complete block information, and transmit the first-stage certificate to the plurality of backup nodes; the backup node is further configured to respectively generate a second-stage certificate and a third-stage certificate according to a block hash value in the first-stage certificate, and the
(Continued)

second-stage certificate and the third-stage certificate are respectively used to negotiate on the block to obtain a negotiation result; and when the block verification is passed and the negotiation result is a successful negotiation, the master node and the plurality of backup nodes are configured respectively to add the block to the copy of the local consortium blockchain.

17 Claims, 5 Drawing Sheets

(51) Int. Cl.
        *H04L 9/32*       (2006.01)
        *H04L 29/08*      (2006.01)
        *H04L 12/24*      (2006.01)
        *H04L 29/06*      (2006.01)
        *H04L 67/60*      (2022.01)
        *H04L 41/0663*    (2022.01)

(52) U.S. Cl.
        CPC .......... *H04L 9/3239* (2013.01); *H04L 9/3263* (2013.01); *H04L 9/3268* (2013.01); *H04L 41/0663* (2013.01); *H04L 63/0823* (2013.01); *H04L 67/32* (2013.01); *G06F 2201/87* (2013.01)

(58) Field of Classification Search
        CPC .. H04L 67/32; G06F 16/2379; G06F 11/1464; G06F 11/1474; G06F 2201/87
        See application file for complete search history.

(56) References Cited

FOREIGN PATENT DOCUMENTS

| | | |
|---|---|---|
| CN | 10678095 A | 5/2017 |
| CN | 106789095 A | 5/2017 |
| CN | 106789908 A | 5/2017 |
| CN | 107146087 A | 9/2017 |

OTHER PUBLICATIONS

Office Action dated Oct. 25, 2018 from a counterpart Chinese patent application No. 201711017023.3. 5 pages.
Office Action dated Nov. 26, 2018 from a counterpart Chinese patent application No. 201711017023.3. 7 pages.
Study and Realization of an Improved PBFT Algorithm as an Ethereum Consensus Mechanism, Huang Qiub et al., School of Computer Science and Technology Donghua University Shanghai, China Computer Applications and Software, vol. 34 No. 10, Oct. 15, 2017, (English Abstract).
OSDI99 paper Practical Byzantine Fault Tolerance: Aug. 22, 2016. (English Abstract).

* cited by examiner

BLOCKCHAIN SYSTEM AND BLOCKCHAIN TRANSACTION DATA PROCESSING METHOD BASED ON ETHEREUM

CROSS-REFERENCE TO RELATED APPLICATIONS

This application is a National Phase filing under 35 U.S.C. § 371 of PCT/CN2017/112664 filed on Nov. 23, 2017, and this application claims priority to Chinese Patent Application No. 201711017023.3, entitled "BLOCKCHAIN SYSTEM AND BLOCKCHAIN TRANSACTION DATA PROCESSING METHOD BASED ON ETHEREUM" filed Oct. 26, 2017, the contents of which is expressly incorporated by reference herein in their entireties.

TECHNICAL FIELD

The present application relates to the technical field of network communication, and in particular, relates to a blockchain system and a blockchain transaction data processing method based on Ethereum.

BACKGROUND

Consortium blockchains are usually blockchains built by some business consortiums with Ethereum technology out of their common interests. The consortium blockchain is not open to the public and is managed only by members of the business consortium. However, members of the business consortium do not fully trust each other. Each member of the consortium has to supervise other members of the blockchain to maintain the accuracy of the consortium blockchain. Before a newly generated block is written into the consortium blockchain, all nodes in the consortium blockchain are required to reach an agreement, that is, to reach a consensus. Therefore, the consensus mechanism of the consortium blockchain is particularly important.

When using the consortium blockchain for transaction, the PBFT (Practical Byzantine Fault Tolerance) mechanism is typically used in the conventional way to cause the nodes to consent. In the PBFT mechanism, the nodes do not need to be mined. Although the large scale of computation required to achieve a consensus through computational competition is avoided, the PBFT consensus mechanism consumes relatively high network resources and has a large network overhead. Therefore, how to effectively reduce the consumption of network resources when transacting through the consortium blockchain becomes a technical problem that needs to be solved now.

SUMMARY

According to various embodiments disclosed herein, a blockchain system and a blockchain transaction data processing method based on Ethereum are provided.

A blockchain system based on Ethereum includes a master node and a plurality of backup nodes:

the master node is configured to receive a transaction request transmitted by a client terminal, perform transaction processing by calling a smart contract deployed in a consortium blockchain according to the transaction request to obtain transaction data; and use the transaction data to generate a block, and broadcast the block to the plurality of backup nodes; and the block has corresponding block information;

the backup node is configured to receive the block and verify the transaction data of the block;

the master node is further configured to generate a first-stage certificate using the complete block information, and transmit the first-stage certificate to the plurality of backup nodes; the backup node is further configured to respectively generate a second-stage certificate and a third-stage certificate according to a block hash value in the first-stage certificate, and the second-stage certificate and the third-stage certificate are respectively used to negotiate on the block to obtain a negotiation result;

when the block verification is passed and the negotiation result is a successful negotiation, the master node and the plurality of backup nodes are configures respectively to add the block into a copy of the local consortium blockchain.

A transaction data processing method based on Ethereum includes:

a master node receiving a transaction request transmitted by a client terminal, performing transaction processing by calling a smart contract deployed in a copy of a local consortium blockchain according to the transaction request to obtain transaction data;

the master node generating a block using the transaction data to verify the transaction data of the block; the block has corresponding block information;

the master node generating a first-stage certificate using the complete block information, and transmitting the first-stage certificate to a plurality of backup nodes, such that the backup node respectively generating a second-stage certificate and a third-stage certificate according to a block hash value in the first-stage certificate, and receiving a negotiation result obtained by the backup node respectively using the second-stage certificate and the third-stage certificate to negotiate on the block; and when the block verification is passed and the negotiation result is a successful negotiation, the master node adding the block into a copy of a local consortium blockchain.

A blockchain transaction data processing method based on Ethereum includes:

a backup node receiving a block broadcasted by a master node, the block is generated by the master node using transaction data obtained from a transaction performed by calling a smart contract deployed in a consortium blockchain when a transaction request transmitted by a client terminal is received; the block has corresponding block information;

the backup node receiving the block, verifies the transaction data of the block; the backup node receiving a first-stage certificate generated by the master node using the complete block information, and generating a second-stage certificate and a third-stage certificate according to a block hash value in the first-stage certificate, and obtaining a negotiation result respectively using the second-stage certificate and the third-stage certificate to negotiate on the block; and when the block verification is passed and the negotiation result is a successful negotiation, the backup node adding the block into a copy of a local consortium blockchain.

A computer device including one or more processors, and a memory storing computer-readable instructions therein, which, when executed by the one or more processors cause the one or more processors to perform steps of either one of the foregoing methods.

One or more computer-readable non-transitory storage medium storing computer-readable instructions therein which, when executed by one or more processors, cause the one or more processors to perform steps of either one of the foregoing methods.

The details of at least one embodiment of the present disclosure will be presented with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

Figure 1:
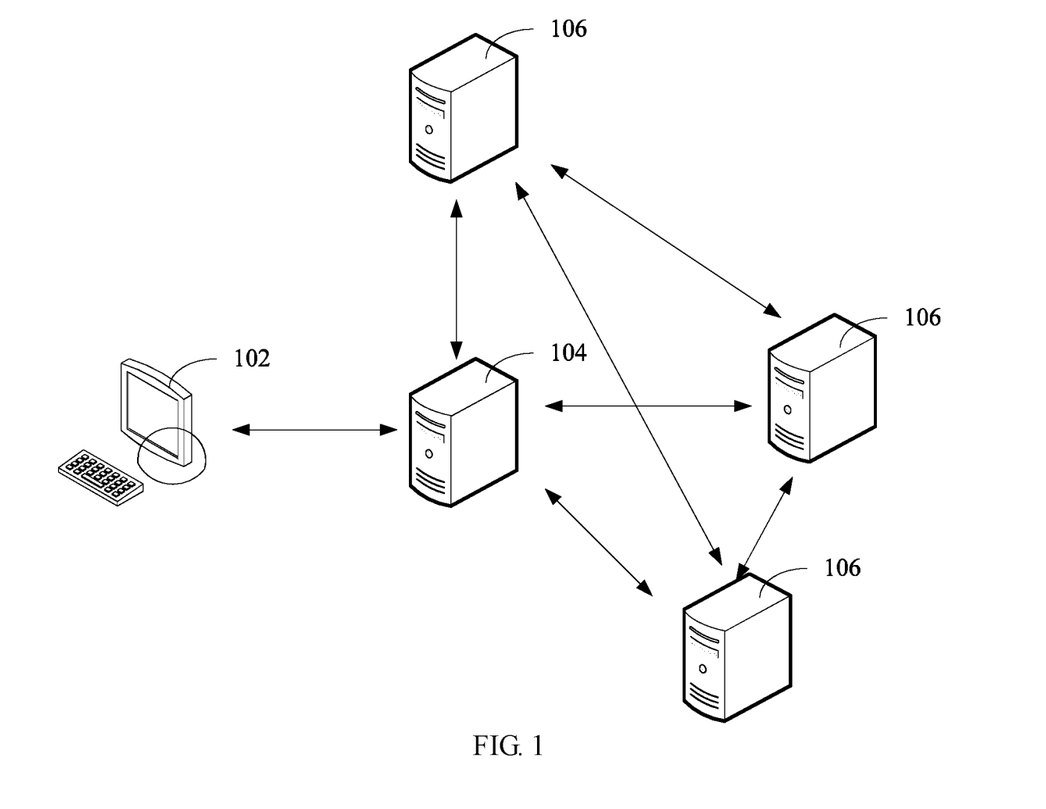
FIG. 1 is a schematic diagram of an application of a blockchain system based on Ethereum according to an embodiment.

The blockchain system based on Ethereum provided herein can be applied in an application environment illustrated in FIG. 1. The client terminal 102 is in communication connection with the first terminal 104 in the blockchain system through the network. The blockchain system further includes a plurality of second terminals 106, and communication connections are established between every two of the first terminal 104 and a plurality of second terminals 106. The first terminal 104 may be referred to as a master node in a blockchain system, and the second terminal 106 may be referred to as a backup node in a blockchain system. A copy of the consortium blockchain is locally stored in the first terminal 104 and the plurality of second terminals 106, respectively. That is to say, the decentralization between multiple nodes of the consortium blockchain and the distributed storage of the consortium blockchain.

The client terminal 102 transmits a transaction request to the first terminal 104, and the first terminal 104 calls the smart contract deployed in the consortium blockchain to perform transaction processing according to the transaction request to obtain transaction data. The first terminal 104 generates a block using the transaction data. Before a block is written into the consortium blockchain, a consensus has to be reached in the blockchain system. To reach a consensus on the block, the block is required to be verified and negotiated. The first terminal 104 broadcasts the block to a plurality of second terminals 106. The second terminal 106 receives the block and verifies the transaction data of the block. The block negotiation may include three stages. The first terminal 104 uses the complete block information to generate the first-stage certificate required for the first-stage negotiation and transmits the first-stage certificate to the plurality of second terminals 106. The second terminal 106 uses the block hash value in the first-stage certificate to generate a second-stage certificate, and transmits the second-stage certificate to the first terminal 104 and other second terminals 106 for the second-stage negotiation, and uses the block hash value to generate a third-stage certificate, and the third-stage certificate is transmitted to the first terminal 104 and other second terminals 106 for third-stage negotiation. When the block verification is passed and the negotiation is successful, it means that a consensus is reached on the block in the blockchain system. The first terminal 104 and the plurality of second terminals 106 respectively add the block into a local consortium blockchain. The second-stage certificate and the third-stage certificate transmitted in the negotiation process are not complete block information, but rather block hash values that can uniquely identify a block. Therefore, the network resource consumption can be effectively reduced during the block consensus process and the communication overhead can be saved.

Figure 2:
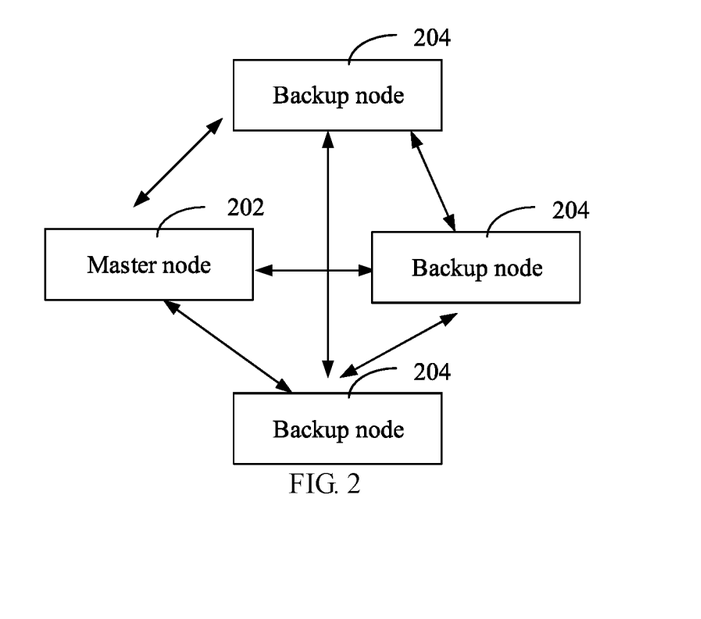
FIG. 2 is a block diagram of a blockchain system based on Ethereum according to an embodiment.

In one embodiment, as shown in FIG. 2, a blockchain system based on Ethereum is provided, including a master node 202 and a plurality of backup nodes 204:

The master node 202 is configured to receive a transaction request transmitted by a client terminal, perform transaction processing by calling a smart contract deployed in a consortium blockchain according to the transaction request to obtain transaction data; and use the transaction data to generate a block, the block has corresponding block information, the block is broadcasted to a plurality of backup nodes.

The backup node 204 is configured to receive the block and verify the transaction data of the block.

The master node 202 is further configured to generate a first-stage certificate using the complete block information, and transmit the first-stage certificate to a plurality of backup nodes; the backup node 204 is further configured to respectively generate a second-stage certificate and a third-stage certificate according to a block hash value in the first-stage certificate, and the second-stage certificate, and the third-stage certificate are respectively used to negotiate on the block to obtain a negotiation result.

When the block verification is passed and the negotiation result is a successful negotiation, the master node 202 and the plurality of backup nodes 204 are configured respectively to add the block into the copy of the local consortium blockchain.

In the present embodiment, the blockchain system based on Ethereum includes a plurality of nodes which include master node and backup node. There can be only one master node and a plurality of backup nodes. The plurality of nodes can form a Byzantine system.

The node has a corresponding configuration file, and the IP address is recorded in the configuration file. Each node establishes a communication connection with other nodes according to the IP address in the configuration file. After the connection is established, a corresponding public key is transmitted to other nodes. The other nodes complete the verification by signing a private key. The verification is passed means a valid connection is established between the nodes.

The consortium blockchain can be viewed as a decentralized, distributed digital ledger among consortium members. A copy of the consortium blockchain is stored locally on both the master node and the backup node respectively. That is to say, a copy of the digital ledger is recorded in each of the nodes in the blockchain system corresponding to the consortium blockchain. The consortium blockchain contains multiple blocks, each of which respectively records the transaction data corresponding to the electronic transaction, including transaction time, transaction object, transaction type, transaction amount and transaction quantity.

Smart contracts can be deployed in advance on the consortium blockchain. A smart contract can be understood as an executable code and defines the rights and obligations of the contract participants. Smart contracts allow parties to trade electronically in accordance with contracts. The master node can receive a transaction request transmitted by the client terminal, and obtain the transaction data by calling the smart contract. The master node generates a block using the transaction data. Specifically, the master node obtains an optimal block in the copy of the local consortium blockchain before generating the block with the transaction data, and determines whether the current time interval from a timestamp of the optimal block is less than a threshold. The threshold can be a maximum time required to reach a consensus in the blockchain system. A block is generated using the transaction data if it is less than a threshold. The block has corresponding block information, and in addition to recording transaction data, the block information also records information such as a hash value corresponding to the block. The hash value contains the block hash value and the parent hash value. The block hash value is a unique identifier for a block. The parent hash value refers to the block hash value of a previous block corresponding to the block.

The master node broadcasts the newly generated block to multiple backup nodes. The backup node receives the block and makes a consensus on the block. The consensus includes both verification and negotiation. Verification can be that multiple nodes (including the master node and the backup node) verify the legality of the block locally. Negotiation requires multiple nodes to agree through three stages of negotiation.

Before (including the master node and the backup node) checking the newly generated block, the nodes obtain the optimal block in the copy of the consortium blockchain, obtain the parent hash value of the newly generated block, and determine whether the parent hash value of the newly generated block is directed to the optimal block, and if yes, the transaction data of the newly generated block is verified; otherwise, the newly generated block is added into the local transaction list. When the nodes check the transaction data of the newly generated block, a Merkle tree is generated using the transaction data contained in the block, and the root hash value of the Merkle tree is calculated. The node acquires the block header transaction tree corresponding to the newly generated block, and calculates a hash value of the transaction tree. If the root hash value of the Merkle tree is the same as the hash value of the block header transaction tree, a warehouse class copy is created locally and the transaction is executed in the warehouse class copy. After the transaction is executed, the node modifies the account information corresponding to the transaction, and uses the modified account information to generate a status tree corresponding to the block, and calculates a root hash value of the state tree. The node generates a receipt tree based on the warehouse class copy and calculates the root hash value of the receipt tree. If the root hash value of the status tree is the same as the root hash value of the receipt tree, the transaction data of the newly generated block is verified.

The consensus of the block also requires a negotiation and agreement between multiple nodes of the blockchain system. According to the Byzantine algorithm, the number of nodes that a Byzantine system can tolerate Byzantine errors does not exceed one third of the total number of nodes. That is to say, in the Byzantine system, as long as two-thirds of the nodes feedback to a block agree to add the information in the consortium blockchain, the negotiation is successful and an agreement is reached. In order to be able to tolerate Byzantine errors, there are 3f+1 nodes in the blockchain system in this embodiment, and f is the maximum number of error nodes allowed in the system. For example, the blockchain system includes at least four nodes. According to the PBFT mechanism, block negotiation needs to go through three stages, including: a pre-preparation stage (also called a first stage), a preparation stage (also called a second stage), and a confirmation stage (also called a third stage). Each stage has a corresponding certificate. The certificate is also the message transmitted during the block consensus process.

Figure 3:
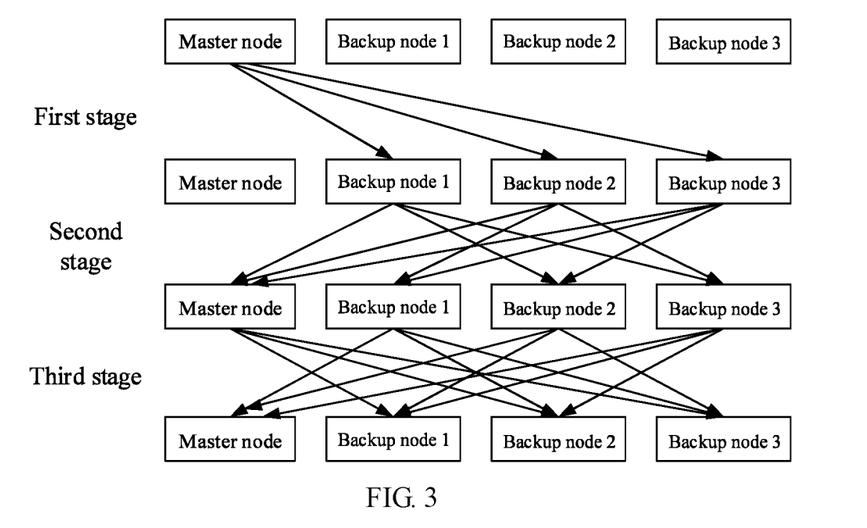
FIG. 3 is a schematic diagram of a block negotiation process according to an embodiment.

The negotiation process of the block is shown in FIG. 3, in which the master node generates the first-stage certificate using the complete block information, and transmits the first-stage certificate to multiple backup nodes. The complete block information is also the full block information corresponding to one block. The master node enters the second-stage status (i.e., the preparation status). When the first-stage certificate is received by the backup node, the complete block information of the block is received, and the backup node enters the second-stage status. When the backup node determines that the first-stage certificate is from the master node and is receiving the certificate for the first time, the backup node saves the first-stage certificate. Thereby, the block information corresponding to the newly generated block is recorded in each backup node. The backup node calculates a corresponding block hash value according to the complete block information, and generates a second-stage certificate by using the block hash value. The second-stage certificate is transmitted to other nodes (including the master node and other backup nodes). The other nodes verify the second-stage certificate. After the verification is passed, the information agreed to the second-stage certificate can be returned. When the second-stage information is agreed by 2f nodes, that is, when the agreement information returned by the 2f nodes for the second-stage certificate is received by the backup node, the backup node enters the third-stage. The backup node uses the block hash value to generate a third-stage certificate, and transmits the third-stage certificate to other nodes. When the third-stage certificate is agreed by 2f+1 nodes (including the backup node itself), the negotiation of the newly generated block in the blockchain system is completed. Since the block hash value can uniquely identify a block, the second-stage certificate and the third-stage certificate can accurately reflect the negotiated block.

Further, the PBFT mechanism can be used to divide the execution process of the blockchain system into a view, and the view includes a master node and multiple backup nodes. Each view can have a corresponding identifier, and each node can also have a corresponding identifier. For example, if the view is marked as v and there are N nodes in the view, the master node can be marked as p, and the backup nodes are marked as 0, 1, ..., N−1, and it is satisfied that p=v mod N. Each node (including the master node and the backup nodes) is initialized with the same view identifier. Since the nodes can be divided into different views, the backup node can also generate the second-stage certificate and the third-stage certificate by using the block hash value, the view identifier, and the node identifier. Since the second-stage certificate and the third-stage certificate contain the view identifier and the node identifier, it is therefore possible to quickly identify in the second-stage and third-stage that from which node the message is issued, so that other nodes can return to the node a message of agreement, which is favorable to improve the efficiency of negotiation.

When the verification work and negotiation work of the block are both completed, a consensus of the block is reached in the blockchain system. The master node and the backup node respectively add the consented block into the copy of the local consortium blockchain. Thereby, the transaction initiated by the client terminal can be implemented safely and effectively.

In the conventional PBFT mechanism, in the three stages of block negotiation, each stage has to generate a corresponding certificate using the complete block information. During each stage of the negotiation process, multiple backup nodes are used to transmit certificates including complete block information, which results in a large amount of network resources being consumed during the negotiation process, resulting in large communication overhead. In this embodiment, the first-stage certificate is generated using the complete block information only in the first-stage of the negotiation, and the second-stage certificate and the third part are respectively generated with the block hash value in the second-stage and the third-stage. Therefore, the network resource consumption can be effectively reduced and the network communication overhead can be effectively saved during the negotiation process of the second-stage and the third-stage.

Moreover, in the conventional way, the verification code and the negotiation code are written in a package of one class. The verification and negotiation of the block can only be performed in a serial manner, and the coupling degree of the two parts is relatively high, resulting in a low consensus efficiency of the block. In this embodiment, the verification code and the negotiation code are respectively written in different classes of packages. Each node can separately run the class corresponding to the verification code and the class corresponding to the negotiation code, so that the verification and negotiation of the block can be performed asynchronously, which reduces the coupling degree between the verification and the negotiation. This is not only beneficial for code maintenance, but is also effectively improving the consensus efficiency of the block.

In the present embodiment, in the blockchain system based on Ethereum, after a transaction request transmitted by a client terminal is received by the master node, a smart contract deployed in a local consortium blockchain is called to perform transaction processing. The master node generates a block using the transaction data and broadcasts the block to a plurality of backup nodes in the blockchain system. The backup node verifies the received block. The master node generates a first-stage certificate using the complete block information, and transmits the first-stage certificate to a plurality of backup nodes; the plurality of backup nodes respectively generate a second-stage certificate and a third-stage certificate according to a block hash value in the first-stage certificate, and the second-stage certificate, and the third-stage certificate are respectively used to negotiate on the block to obtain a negotiation result. The master node generates a first-stage certificate using the complete block information, and transmits the first-stage certificate to a plurality of backup nodes; the plurality of backup nodes respectively generate a second-stage certificate and a third-stage certificate according to a block hash value in the first-stage certificate, and the second-stage certificate and the third-stage certificate are respectively used to negotiate on the block to obtain a negotiation result. The second-stage certificate and the third-stage certificate transmitted in the negotiation process are not complete block information, but rather block hash values that can uniquely identify a block. Therefore, the network resource consumption can be effectively reduced during the block consensus process and the communication overhead can be saved. Thereby, the problem of effectively reducing network resource consumption when transacting through the consortium blockchain is realized.

In one embodiment, the master node and the backup nodes are further configured to obtain a timestamp corresponding to an optimal block in the local consortium blockchain, obtain generation times of the first-stage certificate, the second-stage certificate and the third-stage certificate; and if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In the blockchain system based on Ethereum, a large number of certificates are generated during the negotiation process of the block, and each node will record a large number of certificates correspondingly, including the first-stage certificate, the second-stage certificate and the third-stage certificate. In the traditional PBFT mechanism, in order to reduce the memory consumption of the node, the invalidated certificate can be deleted through the checkpoint protocol. However, in the conventional checkpoint protocol, timed negotiation between multiple nodes is required, and the invalidated certificate is agreed according to the PBFT mechanism. After the consensus is reached, each node deletes the invalidated certificate. Since the consensus process requires a three-stage negotiation, each stage of the negotiation needs to transmit the corresponding certificate, which leads to relatively more network resources in the consensus process.

In this embodiment, each node may perform certificate clearing according to the timestamp of the optimal block in the consortium blockchain. The consortium blockchain is formed in the form of a linked chain table according to the generation time of the block. When a block is added into the consortium blockchain, it indicates that the certificates before the timestamp of the block have been verified, that is, the statuses related to the certificates in the nodes are broadcasted and can be cleared, and the certificate information can be saved in the node forever in the form of a block. Therefore, each node can listen to the local block addition event, and whenever a block is added into the copy of the consortium blockchain, the certificate stored locally before the block time stamp is cleared. Mutual communication is not required between nodes in the whole process, and timely cleaning of certificates is also ensured, the network resource consumption is effectively saved.

In one embodiment, the backup nodes include a first backup node and a second backup node, and when the number of blocks in the copy of the local consortium blockchain of the first backup node is less than the number of blocks in the copy of the local consortium blockchain of the second backup node, the first backup node requests other backup nodes for a block hash value corresponding to the block to be added into the copy of the local consortium blockchain, if an identical hash value presents in the received block hash values and the number of identical hash values exceeds a threshold, the first-stage certificate is locally obtained according to the block hash value, and the corresponding block is added into the copy of the local consortium blockchain via the first-stage certificate.

The solution of the inter-node synchronization block is included in the Ethereum, that is, when a node finds that the block chain maintained by itself is different to certain amount from the block number of the optimal block of the block chain maintained by its trusted node, the node will ask for a block from the node that it trusts (usually a node maintained by the developer) and add the block to the blockchain. And there is no fully trustworthy node in the consortium blockchain, so this solution is not feasible in the consortium blockchain.

In this embodiment, when the status of the copy of the consortium blockchain of a node (the master node or the backup node) is inconsistent with the statuses of the copies of the consortium blockchain of the other nodes, for example, when the number of blocks of the copy of the consortium blockchain of the first backup node is less than the number of blocks of the copy of the consortium blockchain of the second backup node, the first backup node may request the block hash value corresponding to the block to be added into the copy of the consortium blockchain from the 2f+1 nodes in the view to which the first backup node belongs. The block hash value is a 256-bits byte array that uniquely identifies the block. When the block hash values returned by no less than f+1 nodes are the same, it suggests the block corresponding to the block hash value reached a consensus in the blockchain system. The first backup node locally queries the first-stage certificate corresponding to the block. If the first-stage certificate is queried, the complete block information can be obtained according to the first-stage certificate, thereby directly adding the required block into the copy of the consortium blockchain, a synchronization with other node consortium blockchain is implemented. In this process, the first backup node is not required to request the block from other backup nodes or the master node, and the block can be added through the first-stage certificate stored locally, which effectively saves network resource consumption.

In one embodiment, the master node and the plurality of backup nodes form a corresponding view; when the master node fails, the plurality of backup nodes are further configured to acquire a time of joining the blockchain, performance indexes, and a number of responses corresponding to all the backup nodes in the view to which the backup nodes belong; and elect a new master node according to the time of joining the blockchain, the performance indexes, and the number of responses.

In the conventional PBFT mechanism, a view switching protocol is also provided. The view can be identified in the manner mentioned in the foregoing embodiments. When the master node fails, the next numbered backup node becomes the new master node. The view is also switched, and the view number is increased by 1. For example, if the view is marked as v and there are N nodes in the view, the master node can be marked as p, and the backup nodes are marked as 0, 1, . . . , N−1. When the master node fails, the backup node numbered 0 becomes the new master node, and the view number is v+1.

In this embodiment, the abnormality determination of the master node may be determined by the timestamp and the threshold of the optimal block in the copy of the local consortium blockchain of each node. The threshold may be the maximum time that the blockchain system agrees, and a time of the block from generation to addition to the blockchain is less than the threshold.

In one embodiment, when the transaction list in the master node or the backup node is not null, if the interval between the optimal block timestamp and the current time is greater than the threshold, it is determined that the master node is abnormal; or when the transaction list in the master node or the backup node is null, if no block is added into the copy of the consortium blockchain within the threshold time, it is determined that the master node is abnormal. Therefore, through the timestamp and the threshold corresponding to the optimal block, it is possible to swiftly and effectively determine whether the master node in the blockchain system is abnormal.

When it is determined that an abnormality occurs to the master node, a new master node is elected by multiple backup nodes, a view switch is triggered. Multiple backup nodes can be elected according to the following rules to get a new master node: the time when the backup node is added into the blockchain system; the performance index of the backup node; the number of responses of the backup node. The time at which the backup node joined the blockchain coefficient has a first weight, the performance parameter of the backup node has a second weight, and the number of responses of the backup node has a third weight. The backup node calculates the weight values of the other nodes using the first weight, the second weight, and the third weight, respectively, and a new master node is elected according to the weight value. The new master node and other backup nodes form a new view to complete the view switch.

Since the length of time that the backup node have been added into the blockchain system, the performance index of the backup node, and the number of responses are taken into account in the election, it can be ensured that the performance of the elected new master node is the best among the many slave nodes. This makes the switched view more robust.

Figure 4:
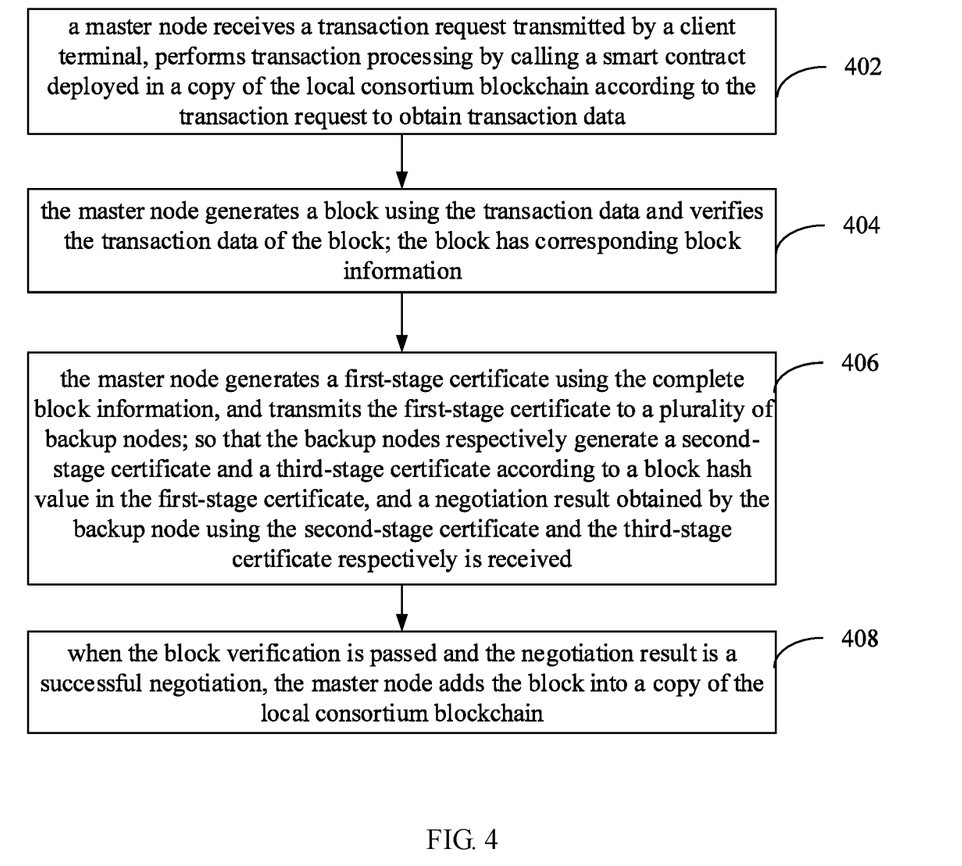
FIG. 4 is a flowchart of a blockchain method based on Ethereum according to an embodiment.

In an embodiment, as shown in FIG. 4, a blockchain transaction data processing method based on Ethereum is provided, it should be understood, that although the various steps in the flow chart in FIG. 4 are successively illustrated following the arrows, these steps do not necessarily have to be carried out according to the sequence indicated by the arrows. Unless otherwise described herein, there is no strict sequence restriction of the execution of these steps which can be executed in difference sequences. Also, at least a part of the steps in FIG. 4 can include several sub-steps or several stages that do not necessarily have to be performed at a same time but can be performed at different moments; and they do not necessarily have to be performed successively but can be performed in turn or in alternate with other steps, sub-steps, stages or at least a part thereof. The method includes the following steps:

In step 402: a master node receives a transaction request transmitted by a client terminal, performs transaction processing by calling a smart contract deployed in a copy of the local consortium blockchain according to the transaction request to obtain transaction data;

In step 404: the master node generates a block using the transaction data and verifies the transaction data of the block; the block has corresponding block information;

In step 406: the master node generates a first-stage certificate using the complete block information, and transmits the first-stage certificate to a plurality of backup nodes; so that the backup nodes respectively generate a second-stage certificate and a third-stage certificate according to a block hash value in the first-stage certificate, and a negotiation result obtained by the backup node using the second-stage certificate and the third-stage certificate respectively is received.

In step 408: when the block verification is passed and the negotiation result is a successful negotiation, the master node adds the block into a copy of the local consortium blockchain.

In the present embodiment, a copy of the consortium blockchain is stored locally on both the master node and the backup node respectively. A smart contract can be deployed on the consortium blockchain, the master node can receive a transaction request transmitted by the client terminal, and obtain the transaction data by calling the smart contract. The master node generates a block using the transaction data. The master node broadcasts the newly generated block to multiple backup nodes. The backup node receives the block and makes a consensus on the block. The consensus includes both verification and negotiation. The verification can be that multiple nodes (including the master node and the backup node) verify the transaction data of the block locally. Negotiation requires multiple nodes to agree through three stages of negotiation.

According to the PBFT mechanism, block negotiation needs to go through three stages, including: a pre-preparation stage (also called a first stage), a preparation stage (also called a second stage), and a confirmation stage (also called a third stage). Each stage has a corresponding certificate. The master node generates the first-stage certificate using the complete block information, and transmits the first-stage certificate to multiple backup nodes. The master node enters the second-stage status (i.e., the preparation status). When the first-stage certificate is received by the backup node, the complete block information of the block is received, and the backup node enters the second-stage status. The backup node saves the first-stage certificate. Thereby, the block information corresponding to the newly generated block is recorded in each backup node. The backup node calculates a corresponding block hash value according to the complete block information, and generates a second-stage certificate by using the block hash value. The second-stage certificate is transmitted to other nodes (including the master node and other backup nodes). The other nodes check the second-stage certificate. After the verification is passed, the information agreed to the second-stage certificate can be returned. When the second-stage information is agreed by 2f nodes, that is, the agreement information returned by the 2f nodes for the second-stage certificate is received by the backup node, the backup node enters the third-stage. The backup node uses the block hash value to generate a third-stage certificate, and transmits the third-stage certificate to other nodes. When the third-stage certificate is agreed by 2f+1 nodes (including the backup node itself), the negotiation of the newly generated block in the blockchain system is completed. Since the block hash value can uniquely identify a block, the second-stage certificate and the third-stage certificate can accurately reflect the negotiated block.

When the verification work and negotiation work of the block are both completed, a consensus of the block is reached in the blockchain system. The master node and the backup node respectively add the consented block into the copy of the local consortium blockchain. Thereby, the transaction initiated by the client terminal can be implemented safely and effectively.

In the present embodiment, the second-stage certificate and the third-stage certificate transmitted in the negotiation process are not complete block information, but rather block hash values that can uniquely identify a block. Therefore, the network resource consumption can be effectively reduced during the block consensus process and the communication overhead can be saved. Thereby, the problem of effectively reducing network resource consumption when transacting through the consortium blockchain is realized.

In one embodiment, the method further includes: the master node obtains a timestamp corresponding to an optimal block in the local consortium blockchain, the master node obtains generation times of the first-stage certificate, the second-stage certificate and the third-stage certificate; and if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In this embodiment, the master node may perform certificate clearing according to the timestamp of the optimal block in the copy of the local consortium blockchain. The certificates include the first-stage certificate, the second-stage certificate, and the third-stage certificate. The consortium blockchain is formed in the form of a linked chain table according to the creation time of the block. When a block is added into the consortium blockchain, it indicates that the certificates before the timestamp of the block have been verified, that is, the statuses related to the certificates in the master node are broadcasted and can be cleared, and the certificate information can be saved in the node forever in the form of a block. Therefore, the master node can listen to the local block addition event, and whenever a block is added into the copy of the consortium blockchain, the certificate stored locally before the block time stamp is cleared. Mutual communication is not required between nodes in the whole process, and timely cleaning of certificates is also ensured, the network resource consumption is effectively saved.

In an embodiment, the method further includes: when the number of blocks in the copy of the consortium blockchain is less than the number of blocks in the first backup node, an obtaining request for the block hash value corresponding to the block to be added is transmitted to the other backup nodes; the block hash values returned by the other backup nodes are received, if identical hash values present in the received plurality of block hash values and the number of identical hash values exceeds the threshold, then the first-stage certificate is obtained locally according to the block hash value; the corresponding block is added into the copy of the consortium blockchain through the first-stage certificate.

When the status of the copy of the consortium blockchain of a node (the master node or the backup node) is inconsistent with the statuses of the copies of the consortium blockchain of the backup nodes, for example, when the number of blocks of the copy of the consortium blockchain of the master backup node is less than the number of blocks of the copy of the consortium blockchain of the first backup node, the master node may request the block hash value corresponding to the block to be added into the copy of the consortium blockchain from the 2f+1 backup nodes in the view to which the first backup node belongs. The block hash value is a 256-bit byte array that uniquely identifies the block. When the block hash values returned by no less than f+1 backup nodes are the same, it suggests the block corresponding to the block hash value reached a consensus in the blockchain system. The master node locally queries the first-stage certificate corresponding to the block. If the first-stage certificate is queried, the complete block information can be obtained according to the first-stage certificate, thereby directly adding the required block into the copy of the consortium blockchain of the master node, a synchronization with other backup node consortium blockchain is implemented. In this process, the master backup node is not required to request the block from other backup nodes, and the block can be added through the first-stage certificate stored locally, which effectively saves network resource consumption.

Figure 5:
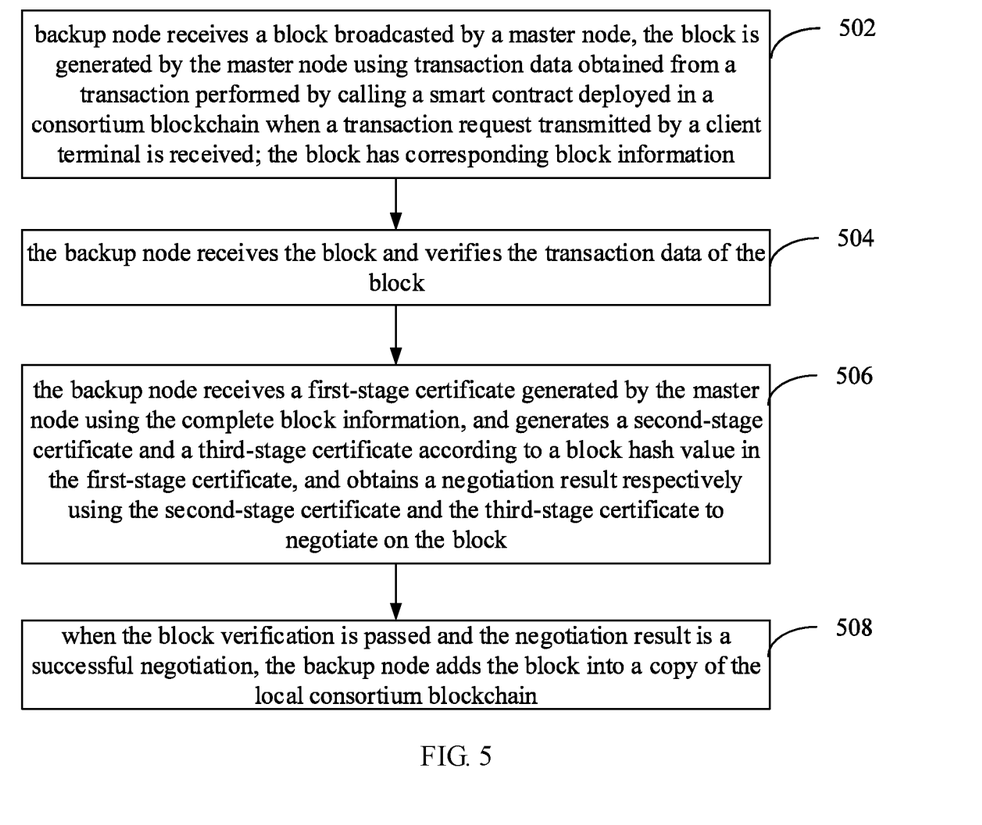
FIG. 5 is a flowchart of a blockchain method based on Ethereum according to another embodiment.

In an embodiment, as shown in FIG. 5, a blockchain transaction data processing method based on Ethereum is provided, it should be understood, that although the various steps in the flow chart in FIG. 5 are successively illustrated following the arrows, these steps do not necessarily have to be carried out according to the sequence indicated by the arrows. Unless otherwise described herein, there is no strict sequence restriction of the execution of these steps which can be executed in difference sequences. Also, at least a part of the steps in FIG. 5 can include several sub-steps or several stages that do not necessarily have to be performed at a same time but can be performed at different moments; and they do not necessarily have to be performed successively but can be performed in turn or in alternate with other steps, sub-steps, stages or at least a part thereof. The method includes the following steps:

In step 502, a backup node receives a block broadcasted by a master node, the block is generated by the master node using transaction data obtained from a transaction performed by calling a smart contract deployed in a consortium blockchain when a transaction request transmitted by a client terminal is received; the block has corresponding block information;

In step 504, the backup node receives the block and verifies the transaction data of the block;

In step 506, the backup node receives a first-stage certificate generated by the master node using the complete block information, and generates a second-stage certificate and a third-stage certificate according to a block hash value in the first-stage certificate, and obtains a negotiation result respectively using the second-stage certificate and the third-stage certificate to negotiate on the block;

In step 508: when the block verification is passed and the negotiation result is a successful negotiation, the backup node adds the block into a copy of the local consortium blockchain.

In the present embodiment, a copy of the consortium blockchain is stored locally on both the master node and the backup node respectively. A smart contract can be deployed on the consortium blockchain, the master node can receive a transaction request transmitted by the client terminal, and obtain the transaction data by calling the smart contract. The master node generates a block using the transaction data. The master node broadcasts the newly generated block to multiple backup nodes. The backup node receives the block and makes a consensus on the block. The consensus includes both verification and negotiation. The verification can be that multiple nodes (including the master node and the backup node) verify the transaction data of the block locally. Negotiation requires multiple nodes to agree through three stages of negotiation.

According to the PBFT mechanism, block negotiation needs to go through three stages, including: a pre-preparation stage (also called a first stage), a preparation stage (also called a second stage), and a confirmation stage (also called a third stage). Each stage has a corresponding certificate.

The master node generates the first-stage certificate using the complete block information, and transmits the first-stage certificate to multiple backup nodes. The master node enters the second-stage status (i.e., the preparation status). When the first-stage certificate is received by the backup node, the complete block information of the block is received, and the backup node enters the second-stage status. The backup node saves the first-stage certificate. Thereby, the block information corresponding to the newly generated block is recorded in each backup node. The backup node calculates a corresponding block hash value according to the complete block information, and generates a second-stage certificate by using the block hash value. The second-stage certificate is transmitted to other nodes (including the master node and other backup nodes). The other nodes check the second-stage certificate. After the verification is passed, the information agreed to the second-stage certificate can be returned. When the second-stage information is agreed by 2f nodes, that is, the agreement information returned by the 2f nodes for the second-stage certificate is received by the backup node, the backup node enters the third-stage. The backup node uses the block hash value to generate a third-stage certificate, and transmits the third-stage certificate to other nodes. When the third-stage certificate is agreed by 2f+1 nodes (including the backup node itself), the negotiation of the newly generated block in the blockchain system is completed. Since the block hash value can uniquely identify a block, the second-stage certificate and the third-stage certificate can accurately reflect the negotiated block.

When the verification work and negotiation work of the block are both completed, a consensus of the block is reached in the blockchain system. The master node and the backup node respectively add the consented block into the copy of the local consortium blockchain. Thereby, the transaction initiated by the client terminal can be implemented safely and effectively.

In the present embodiment, the second-stage certificate and the third-stage certificate transmitted in the negotiation process are not complete block information, but rather block hash values that can uniquely identify a block. Therefore, the network resource consumption can be effectively reduced during the block consensus process and the communication overhead can be saved. Thereby, the problem of effectively reducing network resource consumption when transacting through the consortium blockchain is realized.

In one embodiment, the method further includes: when the master node fails, the backup nodes acquire a time of joining the blockchain, performance indexes, and a number of responses corresponding to all the backup nodes in the view to which the backup nodes belong; and elect a new master node according to the time of joining the blockchain, the performance indexes, and the number of responses.

In this embodiment, when the transaction list in the backup node is not null, if the interval between the optimal block timestamp and the current time is greater than the threshold, it is determined that the master node is abnormal; or when the transaction list in the backup node is null, if no block is added into the copy of the consortium blockchain within the threshold time, it is determined that the master node is abnormal.

When it is determined that an abnormality occurred to the master node, a new master node is elected by multiple backup nodes, a view switch is triggered. An election of new master node can be performed by the plurality of backup nodes according to the time when the backup node is added into the blockchain system, the performance index of the backup node, and the number of responses of the backup node, and a new master node is obtained. The new master node and other backup nodes form a new view to complete the view switch.

Since the length of time that the backup node have been added into the blockchain system, the performance index of the backup node, and the number of responses are taken into account in the election, it can be ensured that the performance of the elected new master node is the best among the many slave nodes. This makes the switched view more robust.

In one embodiment, the method further includes: the backup node obtains a timestamp corresponding to an optimal block in the local consortium blockchain, the backup node obtains generation times of the first-stage certificate, the second-stage certificate and the third-stage certificate; and if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In this embodiment, the backup node may perform certificate clearing according to the timestamp of the optimal block in the copy of the local consortium blockchain. The certificates include the first-stage certificate, the second-stage certificate, and the third-stage certificate. The consortium blockchain is formed in the form of a linked chain table according to the creation time of the block. When a block is added into the consortium blockchain, it indicates that the certificates before the timestamp of the block have been verified, that is, the statuses related to the certificates in the backup node are broadcasted and can be cleared, and the certificate information can be saved in the node forever in the form of a block. Therefore, the backup node can listen to the local block addition event, and whenever a block is added into the copy of the consortium blockchain, the certificate stored locally before the block time stamp is cleared. Mutual communication is not required between nodes in the whole process, and timely cleaning of certificates is also ensured, the network resource consumption is effectively saved.

Figure 6:
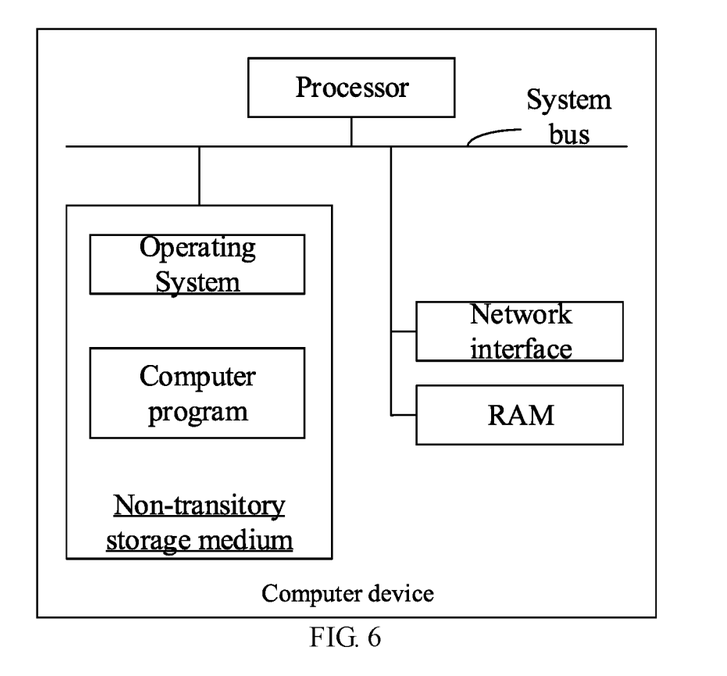
FIG. 6 is a block diagram of a computer device according to an embodiment.

In one embodiment, a computer device is provided, such as a master node or a backup node in a blockchain system, the master or backup node can be a desktop computer, a laptop or a server, and the like. As shown in FIG. 6, the computer device includes a processor, a memory, and a network interface connected through the system bus. The processor of the computer device is configured to provide computation and control capability. The memory of the computer device includes non-transitory storage medium and Random Access Memory (RAM). The non-transitory storage medium has an operating system and computer-readable instructions stored thereon. The RAM of the computer device provides an operation environment for the operating system and the computer-readable instructions in the non-transitory storage medium. The network interface is configured for communication with external terminals through network communication. The computer-readable instructions are executed by the processor to implement a blockchain transaction data processing method based on Ethereum. A person skilled in the art should understand, FIG. 6 is exemplary to show the part of the structure relevant to the embodiment of the present disclosure and does not limit the computer device where the present disclosure is applied; the particular computer device may include more or less components, be combined with other components, or have a different component arrangement.

In one embodiment, it is provided a computer device including one or more processors, and a memory storing instructions, which, when executed by the one or more processors cause the one or more processors to perform steps including:

A master node receives a transaction request transmitted by a client terminal, performs transaction processing by calling a smart contract deployed in a copy of the local consortium blockchain according to the transaction request to obtain transaction data;

The master node generates a block using the transaction data and verifies the transaction data of the block; the block has corresponding block information;

The master node generates a first-stage certificate using the complete block information, and transmits the first-stages certificate to a plurality of backup nodes; so that the backup nodes respectively generate a second-stage certificate and a third-stage certificate according to a block hash value in the first-stage certificate, and a negotiation result obtained by the backup node using the second-stage certificate and the third-stage certificate respectively is received; and When the block verification is passed and the negotiation result is a successful negotiation, the master node adds the block into a copy of the local consortium blockchain.

In one embodiment, when the computer-readable instructions are executed by the processor, the processor is further caused to perform the following steps:

The master node obtains a timestamp corresponding to an optimal block in the local consortium blockchain;

The master node obtains generation times of the first-stage certificate, the second-stage certificate, and the third-stage certificate; and If the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In one embodiment, when the computer-readable instructions are executed by the processor, the processor is further caused to the following steps:

When the number of blocks in the copy of the local consortium blockchain of the master node is less than the number of blocks in the first backup node, an obtaining request to other backup nodes for a block hash value corresponding to the block to be added is transmitted;

Block hash values returned by other backup nodes are received, if identical hash values present in the received plurality of block hash values and the number of identical hash values exceeds a threshold, the first-stage certificate is locally obtained according to the block hash value; and The corresponding block is added into the copy of the local consortium blockchain via the first-stage certificate.

In one embodiment, it is provided a computer device including one or more processors, and a memory storing instructions, which, when executed by the one or more processors cause the one or more processors to perform steps including:

The backup node receives a block broadcasted by a master node, the block is generated by the master node using transaction data obtained from a transaction performed by calling a smart contract deployed in a consortium blockchain when a transaction request transmitted by a client terminal is received; the block has corresponding block information;

The backup node verifies the transaction data of the received block.

The backup node receives a first-stage certificate generated by the master node using the complete block information, and generates a second-stage certificate and a third-stage certificate according to a block hash value in the first-stage certificate, and obtains a negotiation result respectively using the second-stage certificate and the third-stage certificate to negotiate on the block; and When the block verification is passed and the negotiation result is a successful negotiation, the backup node adds the block into a copy of the local consortium blockchain.

In one embodiment, when the computer-readable instructions are executed by the processor, the processor is further caused to perform the following steps:

When the master node fails, the backup node obtains a time of joining the blockchain, performance indexes, and a number of responses corresponding to all the backup nodes in a view to which the backup nodes belong; and A new master node is elected according to the time of joining the blockchain, the performance indexes, and the number of responses.

In one embodiment, when the computer-readable instructions are executed by the processor, the processor is further caused to perform the following steps:

The backup node obtains a timestamp corresponding to an optimal block in the local consortium blockchain;

The backup node obtains generation times of the first-stage certificate, the second-stage certificate, and the third-stage certificate; and If the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In an embodiment, it also provides one or more non-transitory computer-readable storage medium storing computer-readable instructions that, when executed by at least one processors, cause the at least one processor to perform steps as follow:

A master node receives a transaction request transmitted by a client terminal, performs transaction processing by calling a smart contract deployed in a copy of the local consortium blockchain according to the transaction request to obtain transaction data;

The master node generates a block using the transaction data and verifies the transaction data of the block; the block has corresponding block information;

The master node generates a first-stage certificate using the complete block information, and transmits the first-stages certificate to a plurality of backup nodes; so that the backup nodes respectively generate a second-stage certificate and a third-stage certificate according to a block hash value in the first-stage certificate, and a negotiation result obtained by the backup node using the second-stage certificate and the third-stage certificate respectively is received; and When the block verification is passed and the negotiation result is a successful negotiation, the master node adds the block into a copy of the local consortium blockchain.

In one embodiment, when the computer-readable instructions are executed by the one or more processors, the one or more processors are further caused to perform the following steps:

The master node obtains a timestamp corresponding to an optimal block in the local consortium blockchain;

The master node obtains generation times of the first-stage certificate, the second-stage certificate, and the third-stage certificate; and If the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

In one embodiment, when the computer-readable instructions are executed by the one or more processors, the one or more processors are further caused to performs the following steps:

When the number of blocks in the copy of the local consortium blockchain of the master node is less than the number of blocks in the first backup node, an obtaining request to other backup nodes for a block hash value corresponding to the block to be added is transmitted;

Block hash values returned by other backup nodes are received, if identical hash values present in the received plurality of block hash values and the number of identical hash values exceeds a threshold, the first-stage certificate is locally obtained according to the block hash value; and The corresponding block is added into the copy of the local consortium blockchain via the first-stage certificate.

In an embodiment, it also provides one or more non-transitory computer-readable storage medium storing computer-readable instructions that, when executed by at least one processors, cause the at least one processor to perform steps as follow:

The backup node receives a block broadcasted by a master node, the block is generated by the master node using transaction data obtained from a transaction performed by calling a smart contract deployed in a consortium blockchain when a transaction request transmitted by a client terminal is received; the block has corresponding block information;

The backup node verifies the transaction data of the received block.

The backup node receives a first-stage certificate generated by the master node using the complete block information, and generates a second-stage certificate and a third-stage certificate according to a block hash value in the first-stage certificate, and obtains a negotiation result respectively using the second-stage certificate and the third-stage certificate to negotiate on the block; and When the block verification is passed and the negotiation result is a successful negotiation, the backup node adds the block into a copy of the local consortium blockchain.

In one embodiment, when the computer-readable instructions are executed by the one or more processors, the one or more processors are further caused to perform the following steps:

When the master node fails, the backup node obtains a time of joining the blockchain, performance indexes, and a number of responses corresponding to all the backup nodes in a view to which the backup nodes belong; and A new master node is elected according to the time of joining the blockchain, the performance indexes, and the number of responses.

In one embodiment, when the computer-readable instructions are executed by the one or more processors, the one or more processors are further caused to performs the following steps:

The backup node obtains a timestamp corresponding to an optimal block in the local consortium blockchain;

The backup node obtains generation times of the first-stage certificate, the second-stage certificate, and the third-stage certificate; and If the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

A person skilled in the art should understand that the processes of the methods in the above embodiments can be, in full or in part, implemented by computer programs instructing underlying hardware, the computer-readable instructions can be stored in one or more non-volatile computer-readable storage mediums, the computer-readable instructions can include the processes in the embodiments of the various methods when it is being executed. The storage medium can be a disk, a CD, a Read-Only Memory (ROM) and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. A blockchain system based on Ethereum, comprising a master node and a plurality of backup nodes, wherein:
   the master node is configured to receive a transaction request transmitted by a client terminal, perform transaction processing by calling a smart contract deployed in a consortium blockchain according to the transaction request to obtain transaction data; and use the transaction data to generate a block, and broadcast the block to the plurality of backup nodes; and the block has corresponding block information;
   the backup node is configured to receive the block and verify the transaction data of the block;
   the master node is further configured to generate a first-stage certificate using the complete block information, and transmit the first-stage certificate to the plurality of backup nodes; the backup node is further configured to respectively generate a second-stage certificate and a third-stage certificate according to a block hash value in the first-stage certificate, and the second-stage certificate, and the third-stage certificate are respectively used to negotiate on the block to obtain a negotiation result; and
   when the block verification is passed and the negotiation result is a successful negotiation, the master node and the plurality of backup nodes are configured respectively to add the block into a copy of a local consortium blockchain.

2. The system according to claim 1, wherein the master node and the plurality of backup nodes form a corresponding view; when the master node fails, the backup nodes are further configured to acquire a time of joining the blockchain, performance indexes, and a number of responses corresponding to all the backup nodes in the view to which the backup nodes belong; and elect a new master node according to the time of joining the blockchain, the performance indexes, and the number of responses.

3. The system according to claim 1, wherein the master node and the backup nodes are further configured to obtain a timestamp corresponding to an optimal block in the local consortium blockchain, obtain generation times of the first-stage certificate, the second-stage certificate, and the third-stage certificate; and if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

4. The system according to claim 1, wherein the backup nodes comprise a first backup node and a second backup node, and when the number of blocks in the copy of the local consortium blockchain of the first backup node is less than the number of blocks in the copy of the local consortium blockchain of the second backup node, the first backup node requests other backup nodes for a block hash value corresponding to the block to be added into the copy of the local consortium blockchain; if an identical hash value presents in the received block hash values and the number of identical hash values exceeds a threshold, the first-stage certificate is locally obtained according to the block hash value, and the corresponding block is added into the copy of the local consortium blockchain via the first-stage certificate.

5. The system according to claim 1, wherein the master node and the plurality of backup nodes form a corresponding view; when the master node fails, the plurality of backup nodes are further configured to acquire a time of joining the blockchain, performance indexes, and a number of responses corresponding to all the backup nodes in the view to which the backup nodes belong; and elect a new master node according to the time of joining the blockchain, the performance indexes, and the number of responses.

6. The system according to claim 1, wherein each node has a corresponding configuration file configured to record an IP address, each node is configured to establish a communication connection with other nodes according to the IP address, after the connection is established, a corresponding public key is transmitted to other nodes, the other nodes is configured to complete the verification by signing a private key.

7. A blockchain transaction data processing method based on Ethereum, comprising:
   a master node receiving a transaction request transmitted by a client terminal, performing transaction processing by calling a smart contract deployed in a copy of a local consortium blockchain according to the transaction request to obtain transaction data;
   the master node generating a block using the transaction data to verify the transaction data of the block; the block has corresponding block information;
   the master node generating a first-stage certificate using the complete block information, and transmitting the first-stage certificate to a plurality of backup nodes, such that the backup node respectively generating a second-stage certificate and a third-stage certificate according to a block hash value in the first-stage certificate, and receiving a negotiation result obtained by the backup node respectively using the second-stage certificate and the third-stage certificate to negotiate on the block; and when the block verification is passed and the negotiation result is a successful negotiation, the master node adding the block into a copy of the local consortium blockchain.

8. The method according to claim 7, wherein further comprising:
the master node obtaining a timestamp corresponding to an optimal block in the local consortium blockchain;
the master node obtaining generation times of the first-stage certificate, the second-stage certificate, and the third-stage certificate; and
if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

9. The method according to claim 8, wherein each node performs a certificate clearing according to the timestamp of the optimal block in the consortium blockchain.

10. The method according to claim 7, wherein further comprising:
when the number of blocks in the copy of the local consortium blockchain of the master node is less than the number of blocks in the first backup node, transmitting an obtaining request to other backup nodes for a block hash value corresponding to the block to be added;
receiving block hash values returned by other backup nodes, if an identical hash value presents in the received plurality of block hash values and the number of identical hash values exceeds a threshold, the first-stage certificate is locally obtained according to the block hash value; and
adding the corresponding block into the copy of the local consortium blockchain via the first-stage certificate.

11. The method according to claim 10, wherein when a status of a copy of the consortium blockchain of a node is inconsistent with statuses of the copies of the consortium blockchain of the other nodes, the node requests the block hash value corresponding to the block to be added into the copy of the consortium blockchain from the nodes in a view to which the node belongs.

12. A blockchain transaction data processing method based on Ethereum, comprising:
a backup node receiving a block broadcasted by a master node, wherein the block is generated by the master node using transaction data obtained from a transaction performed by calling a smart contract deployed in a consortium blockchain when a transaction request transmitted by a client terminal is received;
the block has corresponding block information;
the backup node receiving the block and verifying the transaction data of the block;
the backup node receiving a first-stage certificate generated by the master node using the complete block information, and generating a second-stage certificate and a third-stage certificate according to a block hash value in the first-stage certificate, and obtaining a negotiation result respectively using the second-stage certificate and the third-stage certificate to negotiate on the block; and
when the block verification is passed and the negotiation result is a successful negotiation, the backup node adding the block into a copy of the local consortium blockchain.

13. The method according to claim 12, wherein further comprising:
when the master node fails, the backup nodes obtaining a time of joining the blockchain, performance indexes, and a number of responses corresponding to all the backup nodes in a view to which the backup nodes belong; and
electing a new master node according to the time of joining the blockchain, the performance indexes, and the number of responses.

14. The method according to claim 12, wherein further comprising:
the backup node obtaining a timestamp corresponding to an optimal block in the local consortium blockchain;
the backup node obtaining generation times of the first-stage certificate, the second-stage certificate, and the third-stage certificate; and
if the generation time of the first-stage certificate or the generation time of the second-stage certificate or the generation time of the third-stage certificate predates the timestamp corresponding to the optimal block, the first-stage certificate or the second-stage certificate or the third-stage certificate is cleared.

15. The method according to claim 14, wherein each node performs a certificate clearing according to the timestamp of the optimal block in the consortium blockchain.

16. The method according to claim 14, wherein when a transaction list in the backup node is not null, if an interval between the optimal block timestamp and a current time is greater than a threshold time, the master node is determined to be abnormal.

17. The method according to claim 14, wherein when the transaction list in the backup node is null, if no block is added into the copy of the consortium blockchain within a threshold time, the master node is determined to be abnormal.

* * * * *